US012259292B2

(12) United States Patent
Ertas et al.

(10) Patent No.: US 12,259,292 B2
(45) Date of Patent: Mar. 25, 2025

(54) SEAL MONITORING APPARATUS

(71) Applicant: General Electric Company, Schenectady, NY (US)

(72) Inventors: Bugra H. Ertas, Niskayuna, NY (US); Deepak Trivedi, Halfmoon, NY (US); Scott Alan Schimmels, Miamisburg, OH (US); Joseph Herbert Fields, Fort Thomas, KY (US); Rahul Anil Bidkar, Clifton Park, NY (US); Eric R. Westervelt, Niskayuna, NY (US); Andrew Kevin Winn, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 17/972,834

(22) Filed: Oct. 25, 2022

(65) Prior Publication Data

US 2024/0133770 A1 Apr. 25, 2024
US 2024/0230470 A9 Jul. 11, 2024

(51) Int. Cl.
*G01M 15/14* (2006.01)
*F01D 11/08* (2006.01)
*F02C 7/28* (2006.01)

(52) U.S. Cl.
CPC .............. *G01M 15/14* (2013.01); *F01D 11/08* (2013.01); *F02C 7/28* (2013.01); *F05D 2220/32* (2013.01); *F05D 2240/55* (2013.01); *F05D 2260/80* (2013.01)

(58) Field of Classification Search
CPC ................... G01M 15/14; F01D 11/08; F01D 11/20–24; F02C 7/28; F05D 2240/55; F05D 2260/80
See application file for complete search history.

(56) References Cited

U.S. PATENT DOCUMENTS

| 5,685,158 | A  | 11/1997 | Lenahan  |
| 5,961,279 | A  | 10/1999 | Ingistov |
| 6,799,112 | B1 |  9/2004 | Carter   |
| 7,094,020 | B2 |  8/2006 | Dong     |

(Continued)

FOREIGN PATENT DOCUMENTS

| EP | 1416124 | 5/2004 | |
| WO | WO-2013066529 A1 * | 5/2013 | ............... F01M 1/20 |

(Continued)

OTHER PUBLICATIONS

USPTO; U.S. Appl. No. 17/972,883; Non-Final Rejection mailed Sep. 20, 2024; (pp. 1-20).

*Primary Examiner* — Steven M Sutherland
(74) *Attorney, Agent, or Firm* — Fitch, Even, Tabin & Flannery LLP

(57) ABSTRACT

A seal monitoring apparatus is provided. The seal monitoring apparatus includes one or more pressure sensors and a controller in communication with the one or more pressure sensors. The one or more pressure sensors is mounted at a seal of a turbine to measure pressure on a first side of the seal and/or a second side of the seal. The controller is configured to receive pressure data from the one or more pressure sensors and determine a condition of the seal based at least in part on the pressure data. The controller is configured to output a signal upon determining a change in the condition of the seal.

14 Claims, 7 Drawing Sheets

(56) References Cited

U.S. PATENT DOCUMENTS

| | | |
|---|---|---|
| 10,082,041 B2 | 9/2018 | Bei |
| 10,458,267 B2 | 10/2019 | Gibson |
| 10,487,679 B2 | 11/2019 | Bagdonis |
| 10,626,741 B2 | 4/2020 | Miller |
| 11,203,815 B2 | 12/2021 | Detor |
| 11,209,086 B2 | 12/2021 | Davis |
| 11,231,340 B2 | 1/2022 | Li |
| 11,243,134 B2 | 2/2022 | Schulte |
| 2003/0074957 A1 | 4/2003 | Lemecha |
| 2015/0211379 A1 | 7/2015 | Doumecq-Lacoste |
| 2017/0219152 A1 | 8/2017 | Petrou |
| 2020/0003205 A1* | 1/2020 | Stokkevåg .............. F04B 49/02 |
| 2020/0066061 A1 | 2/2020 | Tran |
| 2021/0325359 A1 | 10/2021 | Brillon |
| 2021/0325362 A1 | 10/2021 | Brillon |
| 2022/0154649 A1 | 5/2022 | Unton |
| 2023/0312128 A1 | 10/2023 | Schenk |
| 2024/0133309 A1 | 4/2024 | Bidkar |
| 2024/0229666 A9 | 7/2024 | Bidkar |

FOREIGN PATENT DOCUMENTS

| | | |
|---|---|---|
| WO | 2014093286 | 6/2014 |
| WO | 2015113250 | 8/2015 |

\* cited by examiner

DETAIL A

DETAIL B

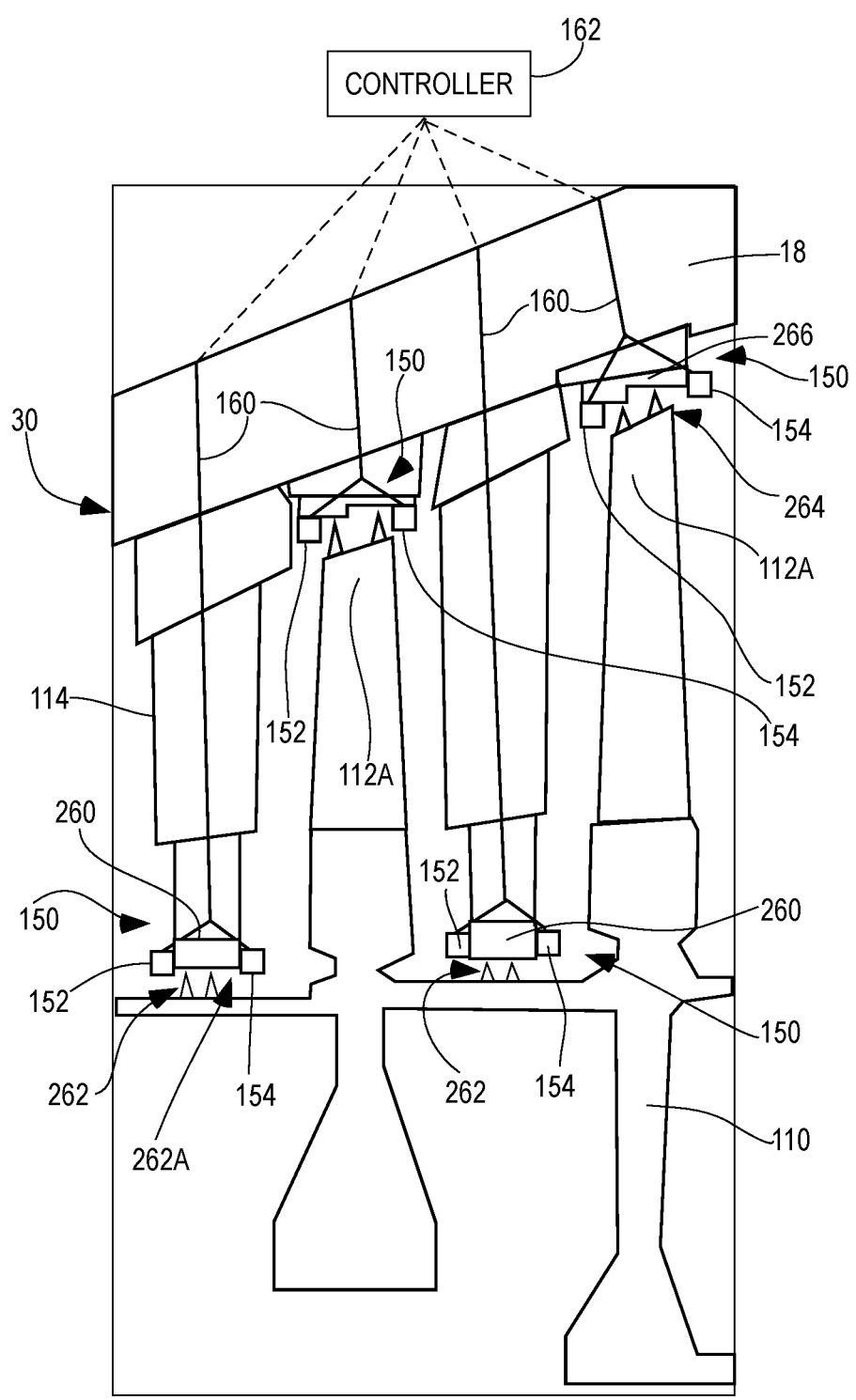

SEAL MONITORING APPARATUS

CROSS-REFERENCE TO RELATED APPLICATION

The related application titled "SEAL MONITORING APPARATUS" filed concurrently herewith on Oct. 25, 2022, as U.S. application Ser. No. 17/972,883, is incorporated herein by reference in its entirety.

TECHNICAL FIELD

The disclosed subject matter relates generally to monitoring systems and, more particularly, to component monitoring systems for engines.

BACKGROUND

Seals impede the flow of fluid from one side of the seal to the other side of the seal. Seals may be static seals or dynamic seals. Static seals are between two surfaces that are stationary relative to one another. Dynamic seals are between two surfaces that move relative to one another. Gas turbine engines include a plurality of seals including, as examples, the compressor discharge pressure (CDP) seal and labyrinth seals in the high-pressure compressor and low-pressure turbine.

BRIEF DESCRIPTION OF THE DRAWINGS

Various needs are at least partially met through provision of the seal monitoring apparatus described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 7 is a detail view of a portion of the gas turbine engine of FIG. 2 including a low-pressure turbine and seal monitoring apparatuses.

Figure 1:
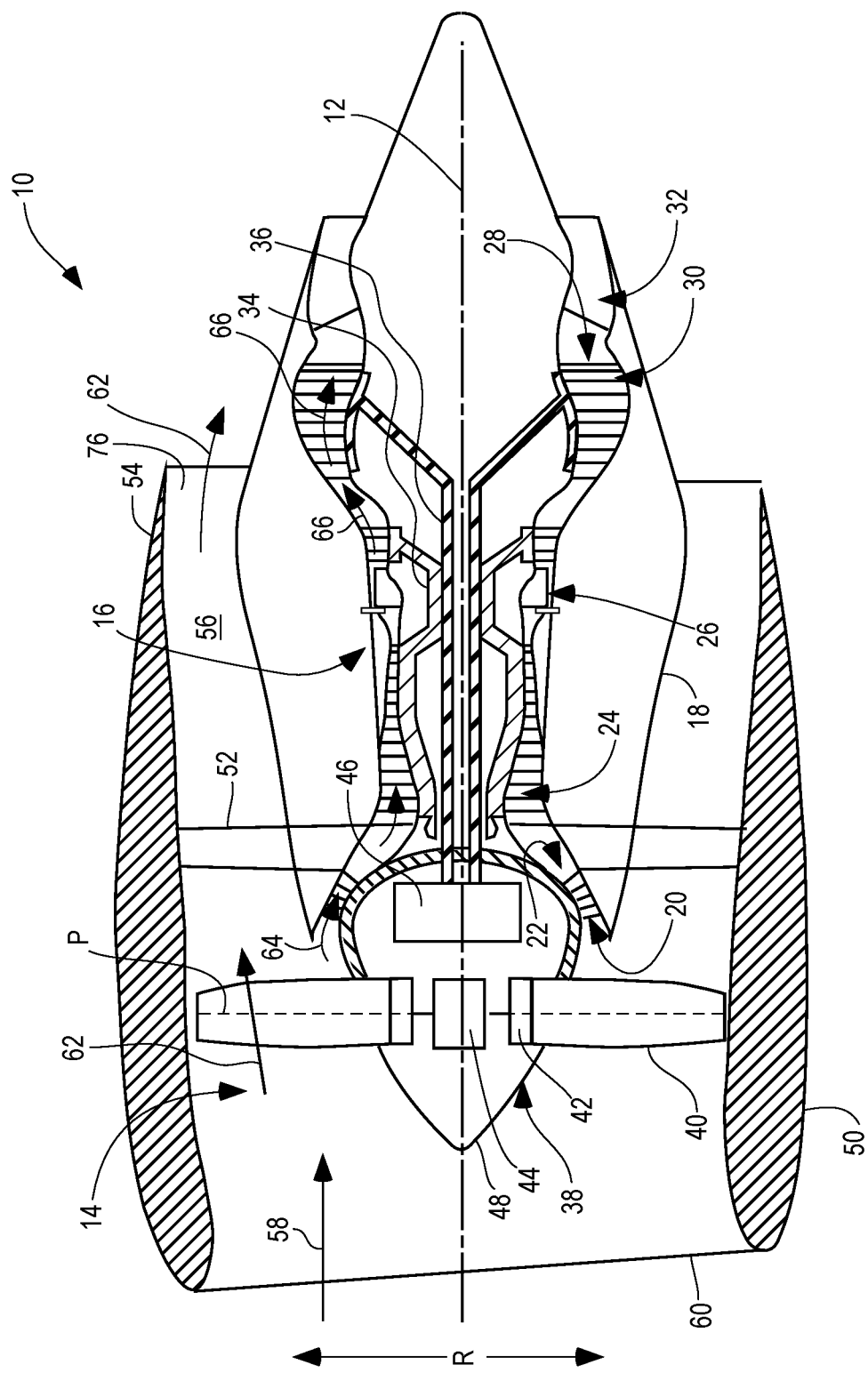
FIG. 1 is a cross-sectional view of a gas turbine engine for an aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The seals of the gas turbine engine wear over time and eventually may fail if not replaced. For instance, regarding the CDP seal, dynamic pressure fluctuations across the seal may result in fatigue cycles that, over time, may cause the CDP seal to deform (e.g., crack). Currently, it is difficult to ascertain the health and/or remaining useful life of seals of the turbine engine.

In general, the present subject matter relates to a seal monitoring apparatus and a method of monitoring a seal. The seal monitoring apparatus may be used for determining a current operational condition of the seal and for determining when to service the seal. Where the seal is determined to have failed, action may be taken to mitigate risks and inhibit collateral damage resulting from the failure of the seal. The seal monitoring apparatus may estimate the remaining useful life of the seal and output an alert when the seal should be serviced. Determining when to service the seal is beneficial because the seal is able to be replaced prior to the seal reaching a failure condition while reducing unnecessary replacement of seals that have not reached the ends of their useful life. As described in further detail herein, the seal monitoring apparatus uses physics-based models for determining the operational condition of the seal and for estimating the remaining useful life of the seal to plan for maintenance of the seal.

In some embodiments, the seal monitoring apparatus includes a pressure sensor and a controller in communication with the pressure sensor. The pressure sensor is mounted at a seal of a turbine to measure pressure on a first side of the seal and/or a second side of the seal. The controller is configured to perform a method for monitoring the seal. The controller is configured to receive pressure data from the pressure sensor and determine a condition of the seal based at least in part on the pressure data. The controller is configured to output a signal upon determining a change in the condition of the seal.

In some embodiments, the controller determines whether the seal is in a good condition or a failure condition based on the pressure data. In some embodiments, where the controller determines the seal is in failure condition, the controller sends a signal to cause adjustment of operation of the turbine associated with the seal. In some embodiments, the device is turbine engine and adjusting the operation of the turbine engine includes operating the turbine engine in a reduced performance mode.

In some embodiments, the controller may determine the condition of the seal has changed from the good condition to the failure condition by detecting a change from a first pressure pattern to a second pressure pattern. Detecting the change from the first pressure pattern to the second pressure pattern may include detecting a shift in an amplitude characteristic of the pressure data and/or a frequency of the pressure data. A shift in the amplitude characteristic and/or frequency of the pressure data may be indicative of a change in the natural frequency of the seal which may indicate that the seal has deformed (e.g., cracked or is cracking).

In some embodiments, the controller may determine the condition of the seal by estimating a life expectancy of the seal based at least in part on the pressure data. The controller sends a message to service the seal when the life expectancy of the seal falls below a predetermined threshold. In some embodiments, estimating the life expectancy of the seal includes identifying fatigue cycles of the seal from the pressure data. In some embodiments, fatigue cycles are identified when a pressure amplitude of the pressure data exceeds a threshold.

In some embodiments, the controller maintains a model (e.g., a digital model) of the seal and estimates the life expectancy of the seal using the model. The controller may record the fatigue cycles experienced by the seal over the life of the seal and update the model based on the fatigue cycles. For example, the controller may update the model based on the amplitude and/or frequency of the fatigue cycles identified in the pressure data.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Turbofan engines have experienced aero-elastic instability induced failures of the CDP seal that have caused in-flight shutdowns. The present subject matter enables implementation of one or more pressure transducers, such as pressure sensors, in the CDP seal cavity in combination with a monitoring logic to facilitate preventative maintenance. In one approach, the pressure sensor is routed though the high-pressure compressor interface flange and through the high-pressure compressor discharge vane into the high-pressure forward cavity of the CDP seal. Routing the pressure sensor through channels integral to guide vanes and other components of the engine permits the pressure sensor to be assembled and disassembled with the engine without significant additional effort. A first pressure sensor may be mounted at one side of the CDP seal while a second pressure sensor is mounted at the other side of the CDP seal to measure the pressure differential across the CDP seal.

The pressure measurement(s), such as pressure data, of the pressure transducer is monitored using the Full Authority Digital Engine Control (FADEC) or other processing unit located on or off the engine. The pressure data is used to determine seal health by, for example, using physics-based models to detect current seal health and damage accumulation of the seal over multiple flights (e.g., over the lifetime of the seal). In some embodiments, failure of the CDP seal may be detected by monitoring the pressure differential across the CDP seal. In some embodiments, the seal health may be determined by monitoring deviation of the spectral content of the pressure data from an expected spectrum. The deviation may be monitored for a certain frequency range or ranges and/or from a mean or static pressure. The expected spectrum may be determined from numerical analysis or from rig or engine measurement. Deviations of the spectral content may be used to generate alerts or maintenance actions.

In some embodiments, a cumulative damage model may be used to estimate the damage to the CDP seal over time (e.g., over the life of the CDP seal) based on the pressure data. The pressure data may be analyzed to identify fatigue cycles of the CDP seal based on the amplitude and/or frequency of the pressure data. The cumulative damage model may account for measurements of other conditions of the engine, for example, N1, N2, T2, P3, WFM, explained in further detail herein. The cumulative damage model may be used to estimate the remaining useful life of the CDP seal so that maintenance may be scheduled.

Referring now to the drawings, wherein identical numerals indicate the same or similar elements throughout the figures, FIG. 1 is a cross-sectional view of a gas turbine engine. The gas turbine engine is a high-bypass turbofan jet engine, referred to herein as "turbofan engine 10." The turbofan engine 10 defines an axial direction A (extending parallel to a longitudinal centerline 12 provided for reference) and a radial direction R. In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The tubular outer casing 18 encases, in serial flow relationship, a compressor section including a low-pressure compressor 22 and a high-pressure compressor 24; a combustion section 26; a turbine section including a high-pressure turbine 28 and a low-pressure turbine 30; and a jet exhaust nozzle section 32. A high-pressure shaft or spool 34 drivingly connects the high-pressure turbine 28 to the high-pressure compressor 24. A low-pressure spool 36 drivingly connects the low-pressure turbine 30 to the low-pressure compressor 22.

The fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by low-pressure spool 36 across a power gearbox 46. The power gearbox 46 includes a plurality of gears for stepping down the rotational speed of the low-pressure spool 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that the outer nacelle 50 may be configured to be supported relative to the core turbine engine 16 by a plurality of circumferentially-spaced outlet guide vanes 52. Moreover, a downstream section 54 of the outer nacelle 50 may extend over an outer portion of the core turbine engine 16 to define a bypass airflow passage 56 therebetween.

During operation of the turbofan engine 10, a volume of air 58 enters the turbofan engine 10 through an associated inlet 60 of the outer nacelle 50 and/or fan section 14. As the volume of air 58 passes across the fan blades 40, a first portion 62 of the air 58 as indicated by arrow is directed or routed into the bypass airflow passage 56 and a second portion 64 of the air 58 as indicated by arrow is directed or routed into the low-pressure compressor 22. The ratio between the first portion 62 of air 58 and the second portion 64 of air 58 is commonly known as a bypass ratio. The pressure of the second portion 64 of air 58 is then increased as it is routed through the high-pressure compressor 24 and into the combustion section 26, where it is mixed with fuel and burned to provide combustion gases 66. Subsequently, the combustion gases 66 are routed through the hot flowpath, or hot-section flowpath, of the high-pressure turbine 28 and the low-pressure turbine 30, where a portion of thermal and/or kinetic energy from the combustion gases 66 is extracted.

The combustion gases 66 are then routed through the jet exhaust nozzle section 32 of the core turbine engine 16 to provide propulsive thrust. Simultaneously, the pressure of the first portion 62 of air 58 is substantially increased as the first portion 62 of air 58 is routed through the bypass airflow passage 56 before it is exhausted from a fan nozzle exhaust section 76 of the turbofan engine 10, also providing propulsive thrust.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may instead be any other suitable aeronautical gas turbine engine, such as a turbojet engine, turboshaft engine, turboprop engine, etc. Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
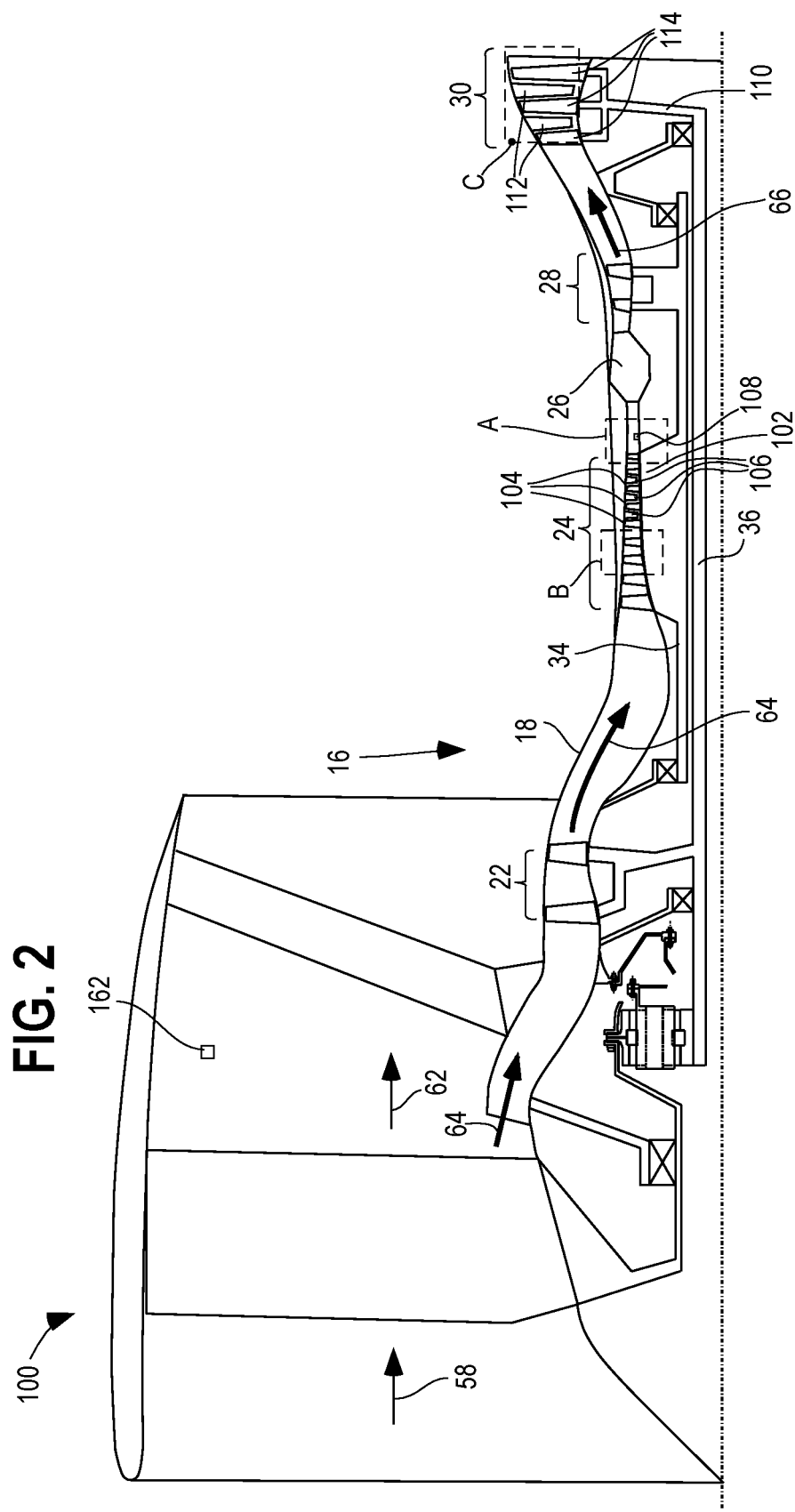
FIG. 2 is a cross-sectional view of a portion of a gas turbine engine similar to the gas turbine engine of FIG. 1.
Figure 4:
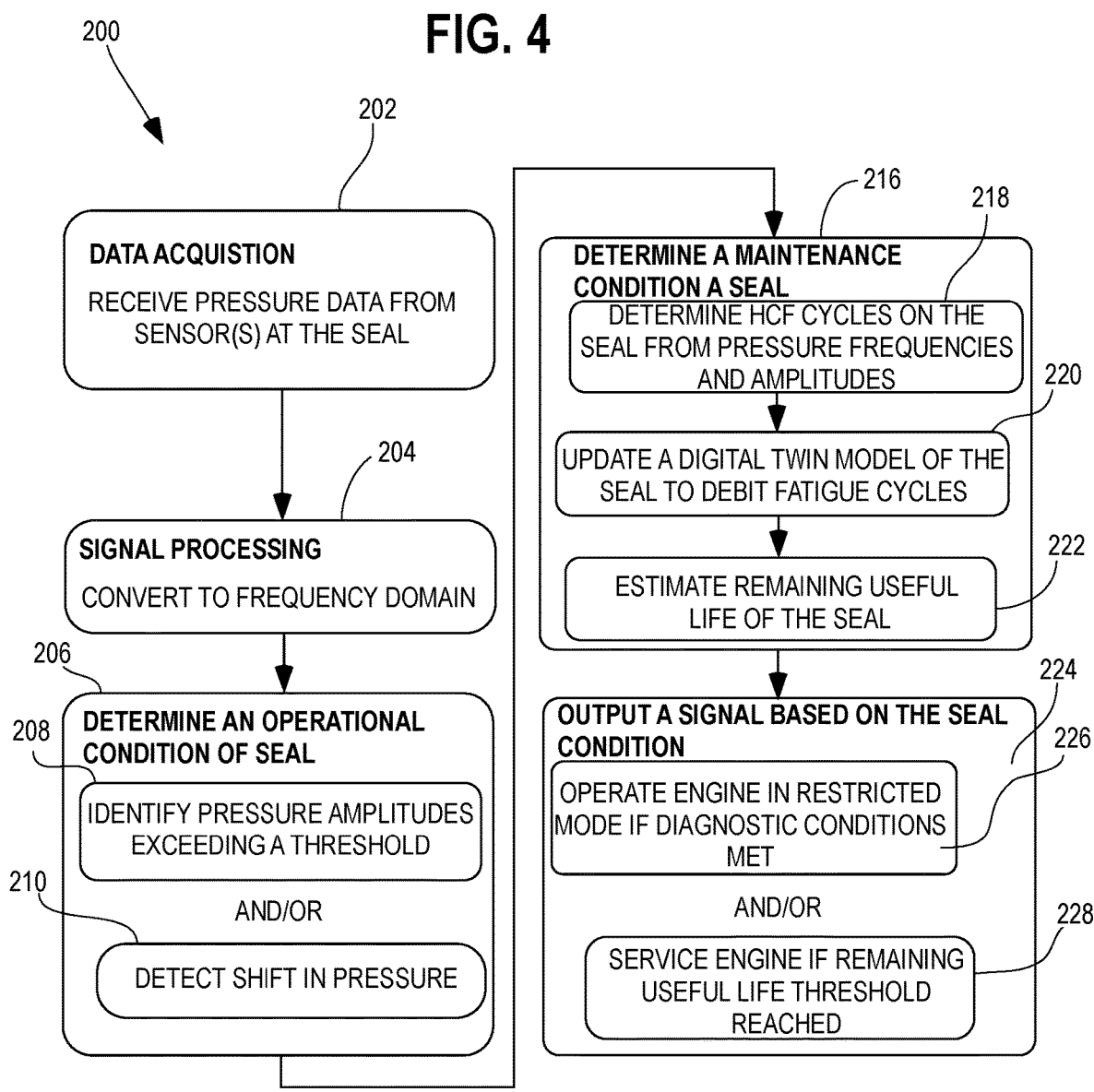
FIG. 4 is a flow diagram for monitoring the CDP seal using the seal monitoring apparatus of FIG. 3.

With reference to FIG. 2, a cross-sectional view of a portion of a turbofan engine 100 is provided. The turbofan engine 100 of FIG. 2 is similar in many respects to the turbofan engine 10 of FIG. 1 such that similar features of the turbofan engine 10 described above are referenced in FIG. 2 using the same reference numerals. The turbofan engine 100 includes the core turbine engine 16 having the substantially tubular outer casing 18 defining a core flow path. The second portion 64 of air 58 is routed along the core flow path to the low-pressure compressor 22, the high-pressure compressor 24, and the combustion section 26. The high-pressure compressor 24 includes a compressor rotor 102 of the high-pressure spool 34 with a plurality of stages of compressor airfoils 104 spaced axially along the compressor rotor 102 (see also FIG. 6). The compressor airfoils 104 are rotated relative to the tubular outer casing 18 with rotation of the high-pressure spool 34 to direct air toward the combustion section 26. A plurality of sets of guide vanes 106 extend from the tubular outer casing 18 in between each stage of the compressor airfoils 104 to reduce the rotational motion of the air and to direct the air axially toward the combustion section 26. A CDP seal 108 extends from the compressor rotor 102 after the last stage of the high-pressure compressor 24 as discussed in further detail below with respect to FIG. 4.

Upon flowing to the combustion section 26, the second portion 64 of air 58 is mixed with fuel and burned to produce the combustion gases 66 that flow through the low-pressure turbine 30 and through the jet exhaust nozzle section 32 of the core turbine engine 16 to provide propulsive thrust. The low-pressure turbine 30 includes the turbine rotor 110 of the low-pressure spool 36 with a plurality of stages of turbine airfoils 112 spaced axially along the turbine rotor 110 that rotate relative to the tubular outer casing 18 (see also FIG. 7). A plurality of sets of turbine nozzles 114 extend from the tubular outer casing 18 in between each stage of the turbine airfoils 112 to direct the combustion gases 66 axially toward the jet exhaust nozzle section 32 and out of the core turbine engine 16.

Figure 3:
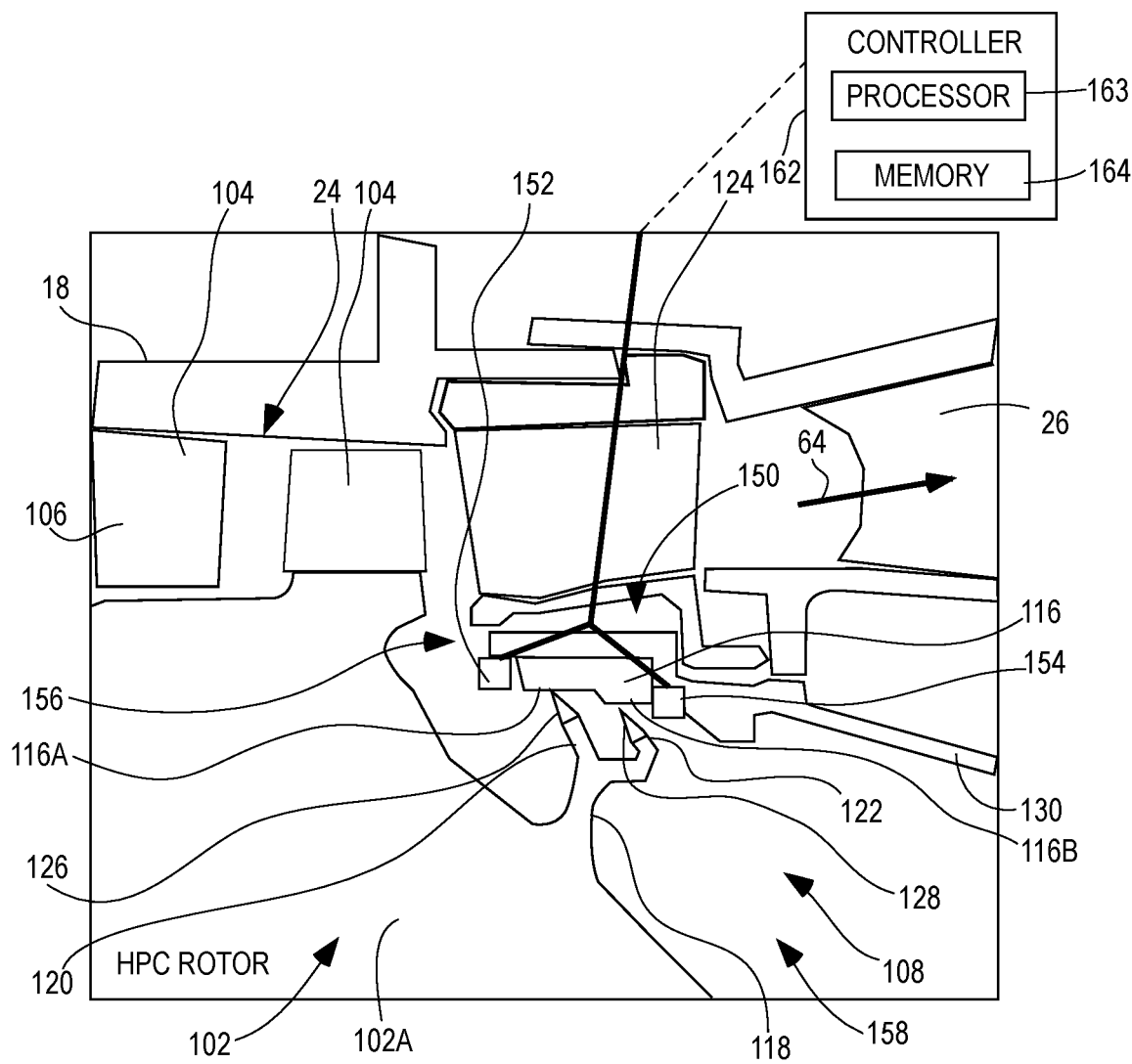
FIG. 3 is a detail view of a portion of the gas turbine engine of FIG. 2 including a compressor discharge pressure (CDP) seal and a seal monitoring apparatus.

With respect to FIG. 3, a detail view of section A of the turbofan engine 100 of FIG. 2 between the high-pressure compressor 24 and the combustion section 26 is shown. The CDP seal 108 extends from the compressor rotor 102 toward a seal stator 116 mounted to an internal support 130. The CDP seal 108 includes an arm 118 that extends from a body 102A of the compressor rotor 102 to two axially spaced seal flanges 120, 122. The seal stator 116 is positioned radially inward of an exit guide vane 124 directing flow toward the combustor. The seal stator 116 includes a first seal surface 116A and a second seal surface 116B downstream of the first seal surface 116A. The first seal surface 116A may have a diameter that is greater than the second seal surface 116B. The first seal flange 120 of the CDP seal 108 includes a tip or seal end portion 126 that creates a seal (e.g., a clearance seal) with the first seal surface 116A to inhibit fluid from passing therebetween. The second seal flange 122 of the CDP seal 108 includes a tip or seal end portion 128 that creates a seal (e.g., a clearance seal) with the second seal surface 116B to inhibit fluid from passing therebetween. The seal end portions 126, 128 may be coated with an abradable material. Coating the end portions 126, 128 with an abradable material is beneficial in that the abradable material may be recoated on the end portions 126, 128 when the end portions 126, 128 wear (e.g., in the event of a rub) rather than having to replace the entire rotor 102. The CDP seal 108 seals a first cavity 156 from a second cavity 158. For instance, the CDP seal 108 inhibits fluid from flowing from the first cavity 156 to the second cavity 158 (and vice versa) which may maintain a pressure differential between the cavities 156, 158.

As the turbofan engine 100 operates, the compressor rotor 102 rotates the CDP seal relative to the seal stator 116 and creates a dynamic seal therebetween. The CDP seal 108 may vibrate due to the fluctuations in pressure in the cavities 156 and 158 on either side of the CDP seal 108. The fluctuations in pressure apply a force on the CDP seal 108 causing the CDP seal 108 to move axially (e.g., oscillate) relative to the seal stator 116. For example, the CDP seal 108 may bend at the arm 118 as the pressure fluctuates. The pressure in the cavities 156 and 158 may fluctuate at one or more known or expected frequencies due to pressure fluctuations caused by operation of the turbofan engine 100, e.g., operation of the high-pressure compressor 24. Over time, this bending or oscillation of the CDP seal 108 may cause the CDP seal to deform (e.g., plastic deformation) or break.

In one approach, to monitor the condition of the CDP seal 108, a seal monitoring apparatus 150 is positioned within the core turbine engine 16 to monitor the pressure at the CDP seal 108 of the core turbine engine 16 over time. The seal monitoring apparatus 150 includes one or more sensors, such as a first pressure sensor 152 and a second pressure sensor 154. The first and second pressure sensors 152, 154 may be operable to measure the amplitude of pressure. The first and second pressures sensors 152, 154 may be, as examples, a strain gauge, piezoelectric, and/or capacitive pressure sensors. In one embodiment, the first pressure sensor 152 may be positioned at a first side of the CDP seal 108, for example, positioned to collect pressure data in the first cavity 156. The second pressure sensor 154 may be positioned at a second side of the CDP seal 108, for example, positioned to collect pressure data in the second cavity 158. In one embodiment, the first pressure sensor 152 is mounted to the internal support 130 and the second pressure sensor 154 is mounted to the internal support 130 with the seal stator 116 between the first and second pressure sensors 152, 154. In one embodiment, the pressure sensors 152, 154 are additionally or alternatively mounted to the seal stator 116. In some embodiments, the pressure sensors 152, 154 are pressure sensors of the core turbine engine 16 that monitor the pressure in the cavities on either side of the CDP seal 108, for example, a pressure sensor mounted to a case of the compressor. In some embodiments, the seal monitoring apparatus 150 includes one of the first and second pressure sensors 152, 154 mounted at one side of the CDP seal 108.

The seal monitoring apparatus 150 includes one or more wires 160 extending from the pressure sensors 152, 154 to a controller 162. The controller 162 includes a processor 163 in communication with memory 164. The wires 160 may be routed through an internal cavity or channel of the exit guide vane 124. For example, the exit guide vane 124 may include an internal channel extending radially within the exit guide vane 124 that the wires 160 extend through from the pressure sensors 152, 154 to the tubular outer casing 18. The wires 160 may extend through an opening in the tubular outer casing 18 and out of the core turbine engine 16. In other forms, the pressure sensors 152, 154 communicate with the controller 162 wirelessly, for example, communicating via one or more wireless protocols. The controller 162 may be a computing device located on or off of the turbofan engine 100. The controller 162 communicates with the pressure sensors 152, 154 via the wires 160 to receive data from the pressure sensors 152, 154 (e.g., pressure data). In one embodiment, the controller 162 is an engine controller such as Full Authority Digital Engine Control (FADEC). In one embodiment, the controller 162 is a computer of the aircraft associated with the turbofan engine 100. In one embodiment, the seal monitoring apparatus 150 includes its own computing device mounted to the turbofan engine 100 as the controller 162. The controller 162 may be comprised of multiple computing devices of the turbofan engine 100, seal monitoring apparatus 150, and/or aircraft communicating with one another. The controller 162 may communicate data (e.g., sensor data, alerts, warnings) to other computers or controllers of the turbofan engine 100 and/or associated aircraft, for example, via a wired and/or wireless connection therebetween. The controller 162 may further include an off-board computer (e.g., a ground-based computer) in communication with another computer onboard the aircraft, such as a computer of the turbofan engine 100 and/or aircraft. For example, the seal monitoring apparatus may collect data during a flight and communicate the data to the ground-based computer after the flight to determine the condition of the seal (e.g., remaining seal life).

The controller 162 may process the data received from the pressure sensors 152, 154 to determine a condition of the CDP seal 108, for example, the health and/or remaining useful life of the seal. With respect to FIG. 4, an example process 200 is provided for monitoring the health of the CDP seal 108. The controller 162 may receive 202 pressure data from the first pressure sensor 152 and/or second pressure sensor 154 to monitor the pressure in the first cavity 156 and/or second cavity 158 on either side of the CDP seal 108. In some forms, the controller 162 monitors the condition of the CDP seal 108 in real time. In some forms, the sensor data is stored in memory and processed by the controller 162 at a later time. For example, a computing device of the controller 162 onboard the aircraft may store sensor data collected during a flight in memory and may transmit the sensor data to a computing device of the controller 162 (e.g., a ground-based computer) for processing after the flight. The pressure data received from the pressure sensors 152, 154 may be the pressure amplitude in the first and second cavities 156, 158. The controller 162 may determine the pressure differential across the CDP seal 108 by subtracting the amplitude (e.g., the mean amplitude) of the pressure in the second cavity 158 from the amplitude (e.g., the mean amplitude) of the pressure in the first cavity 156 at a given time or over a period of time. With respect to FIG. 5A, an example graph 170 is provided showing a line 172 indicating the measured pressure amplitude differential across the CDP seal 108 versus time. The controller 162 may store the sensor data in a memory.

The controller 162 may process 204 the pressure data received from the pressure sensors 152, 154. In one embodiment, the controller 162 may convert the pressure data to the frequency domain, for example, by performing a Fast Fourier Transform (FFT) on the pressure data. With respect to FIG. 5B, a graph 174 is provided illustrating an example of the dynamic pressure data of the graph 170 of FIG. 5A converted to the frequency domain and graphing the dynamic amplitude of the pressure as a function of frequency.

Figure 5A:
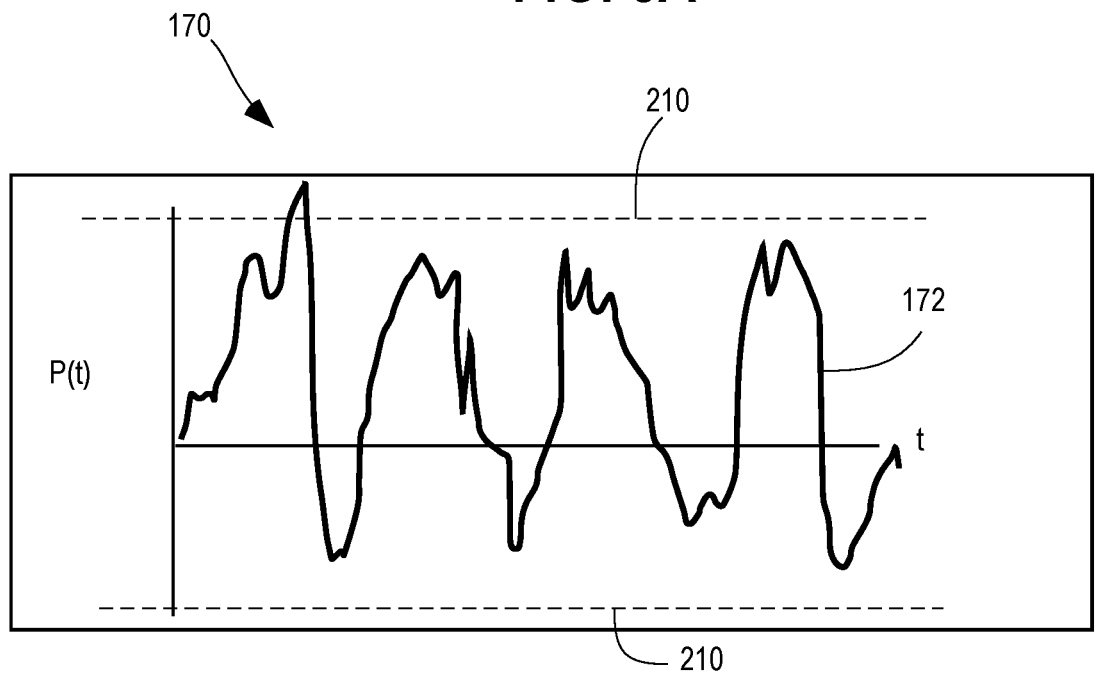
FIG. 5A is a graph of pressure data collected by the seal monitoring apparatus of FIG. 3 in the time domain.
Figure 5B:
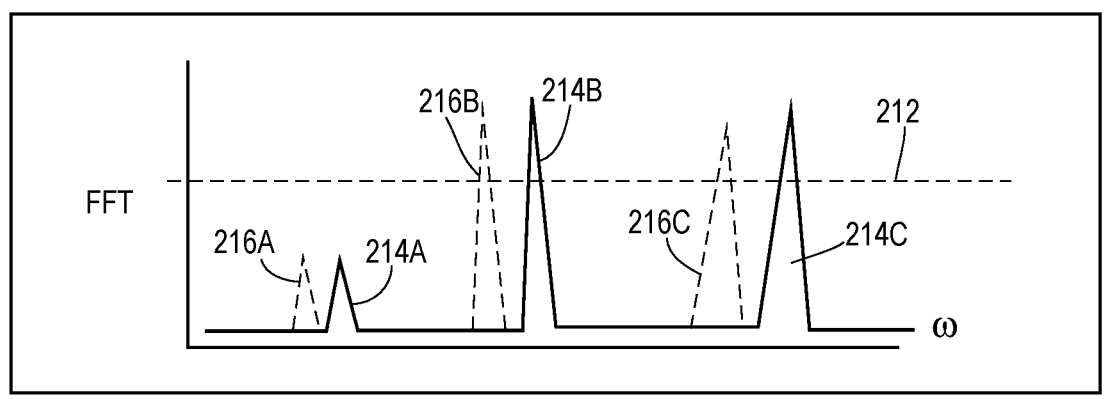
FIG. 5B is a graph of pressure data collected by the seal monitoring apparatus of FIG. 3 in the frequency domain.

The controller 162 may determine 206 a health or operational condition of the CDP seal 108 based on the pressure data, for example, whether the seal is in a good condition or a failure condition. The failure condition may indicate that the seal is no longer functioning properly (e.g., the seal has failed) and/or that the seal is failing such that failure is imminent. The seal no longer functions properly when the seal 108 is not able to sufficiently fluidly separate the cavities on either side of the seal 108, for example, when the seal is cracked or deformed. The controller 162 may identify 208 dynamic pressure amplitudes of the pressure data exceeding a threshold. For example, the controller 162 may monitor the mean amplitude of the pressure differential across the CDP seal 108 measured by the first and second pressure sensors 152, 154. With reference to FIG. 5A, the controller 162 may detect when the net pressure on the CDP seal 108 exceeds a threshold 210 at any given time (e.g. positive and/or negative). For example, the pressure threshold may be 1% of the mean pressure across the CDP seal 108. The controller 162 may use a model (e.g., based on experimentally collected data) to predict when the pressure detected at one or both sides of the seal is indicative of a pressure on the CDP seal 108 that exceeds a threshold. With reference to FIG. 5B, the controller 162 may detect when the dynamic amplitude of pressure at certain frequencies exceed a threshold 212, for example frequencies expected given an operational parameter of the turbofan engine 100 (e.g., the RPM of the engine). The dynamic amplitude of the pressure on the CDP seal 108 corresponds to the amount of force applied to the CDP seal 108 that moves the CDP seal 108 axially as discussed above. The thresholds 210, 212 may be selected based on the amount of force the CDP seal 108 is able to safely withstand, for example, without plastic deformation or the amount of force resulting in a high cycle fatigue (HCF) on the CDP seal 108.

Additionally or alternatively, the controller 162 may detect a shift in pressure at the CDP seal 108 that may be indicative of a failure condition. The controller 162 may determine when a sudden change or shift in pressure occurs. The controller 162 may determine a normal pressure pattern for the CDP seal 108, for example, based on historical pressure data. In one form, the controller 162 may receive engine operation data (e.g., RPMs) from a computing device of the turbofan engine 100, for example, the FADEC. The controller 162 may determine a normal pressure pattern for the CDP seal 108 based on the current engine operation data. The controller 162 may compare current pressure data to the normal pressure pattern to detect a shift or deviation from the normal pressure pattern. Such a shift in the pressure pattern from the normal pressure pattern may be indicative of a change in the natural frequency of the CDP seal 108. A change in the natural frequency of the CDP seal 108 occurs when the stiffness of the CDP seal changes, for example, when a crack is forming or has formed in the CDP seal 108.

In one embodiment, the controller 162 may detect a change in the natural frequency of the CDP seal 108 upon detecting a shift in the spectral content of the pressure data, for example, a change in the frequency peaks of the pressure data. For example, and with reference to FIG. 5B, when the CDP seal 108 is in a good condition the spectral content of the pressure data may have first set frequencies 214A, 214B, 214C. The spectrum of frequencies where the CDP seal 108 is in a good condition may be determined when the CDP seal 108 is known to be in a good condition, for example, when the seal is known to be new and/or a new seal has recently been installed. When the spectral content of the pressure data shifts to a second set of frequencies 216A, 216B, 216C, the controller 162 may determine that the CDP seal 108 is failing or has failed.

In one embodiment, the controller 162 may detect an amplitude shift in the pressure data. For example, the controller 162 may determine when there is a shift in an amplitude characteristic of the pressure data, for example, a shift in mean pressure or root-mean-square pressure. Such a shift in amplitude may also be indicative of a change in the natural frequency of the CDP seal 108 and thus may be indicative of a crack or other deformation of the CDP seal 108 such that the seal is in a failure condition.

In one embodiment, the controller 162 may monitor the pressure in the first cavity 156 and the second cavity 158. When the controller 162 detects that the pressure in the first cavity 156 has equalized with the pressure in the second cavity 158, the controller 162 may determine that the CDP seal 108 has failed (e.g., cracked) and is in a failure condition.

The controller 162 may determine 216 a maintenance condition of the CDP seal 108 based on the pressure data of the pressure sensors 152, 154. The maintenance condition may be whether the life expectancy of the seal has fallen below a threshold such that the CDP seal 108 needs to be serviced. The controller 162 may estimate the remaining useful life of the seal to predict when the CDP seal 108 will need to be serviced such that the CDP seal 108 may be serviced before the CDP seal 108 fails. To determine the maintenance condition of the CDP seal 108, the controller 162 may estimate a life expectancy of the CDP seal 108. The controller 162 may determine 218 when the CDP seal 108 is experiencing fatigue cycles upon analyzing the pressure data (e.g., pressure frequencies and/or pressure amplitudes). The controller 162 may identify fatigue cycles (e.g., HCF cycles) from the pressure data and count the number of fatigue cycles experienced by the CDP seal 108, for example, during a flight and/or during the lifetime of the CDP seal 108. The CDP seal 108 may be rated or estimated to be able to withstand a certain number of HCF cycles before the CDP seal 108 fails. The controller 162 may store a digital twin model of the CDP seal 108 that includes the amount of HCF cycles the CDP seal 108 is able to withstand and/or has experienced over the lifetime of the CDP seal 108.

The controller 162 may update 220 the digital twin model upon identifying a HCF cycle on the CDP seal 108. For example, the controller 162 may subtract or debit a fatigue cycle from the total number of fatigue cycles the CDP seal 108 is estimated to be able to withstand during its lifetime. The controller 162 may assign a weight to each fatigue cycle based on the amplitude of the cycle. For example, a greater amount of life may be subtracted for higher pressure amplitudes which correspond to a greater amount of force applied to the CDP seal 108. The damage accumulation of the CDP seal 108 from the pressure data may be weighted in view of other measurements of the engine 100, for example, the speed of the of the low-pressure spool 36 (N1), the speed of the high-pressure spool 34 (N2), the temperature at the exit of the low-pressure compressor 22 (T2), the pressure at the exit of the high-pressure compressor 24 (P3), the fuel mass flow into the combustion section 26 (WFM), etc.

The controller 162 may estimate 222 a remaining useful life of the CDP seal 108 based on the amount and/or intensity of the fatigue cycles the controller 162 determines the CDP seal 108 to have experienced. For example, the controller 162 may estimate that the CDP seal 108 has approximately 50% of useful life remaining when the CDP seal 108 has experienced 50% of the fatigue cycles the CDP seal 108 is estimated to be able to withstand. The controller 162 may determine the CDP seal 108 needs to be serviced when the estimated remaining useful life falls below a threshold, for example, 20% useful life remaining.

As another example, the controller 162 may estimate the time when the CDP seal 108 will need to be serviced. For example, the controller 162 may estimate a wear rate of the CDP seal 108 by estimating an average number of fatigue cycles the CDP seal 108 experiences per hour of engine operation (e.g., based on historical data). Based on the remaining amount of fatigue cycles the CDP seal 108 is estimated to be able to withstand and the wear rate, the controller 162 may predict the amount of hours the engine may be operated before the CDP seal 108 needs to be serviced. The controller 162 may estimate day or time when the seal will be in need of maintenance based on predicted engine operation (e.g., a flight schedule).

The controller 162 may output 224 a signal based on the determined condition of the CDP seal 108. Where the controller 162 determines 206 the operational condition of the seal is in a failure condition, the controller 162 may output 226 a signal to cause the turbofan engine 100 to operate in a restricted or reduced performance mode. For example, the controller 162 may communicate a message to a computer of the aircraft or engine 100 that the CDP seal 108 is failing or has failed to cause the computer of the aircraft or engine 100 to operate the engine 100 in a reduced performance mode. The reduced performance mode may be a mode of operation where the speed (e.g., RPM) of the engine 100 is limited. As another example, the power of the engine 100 is limited in the reduced performance mode.

Where the controller 162 determines 216 that the CDP seal is in need of servicing or maintenance, the controller 162 may output 228 an alert indicating that the CDP seal 108 needs maintenance. For example, the controller 162 may send an alert indicating that the CDP seal 108 should be replaced and/or when the CDP seal 108 should be replaced by. The controller 162 may include a ground-based computer that determines when the seal needs to be serviced and may send a message to a computer of the aircraft, a maintenance crew, etc. upon determining the CDP seal 108 should be replaced. The controller 162 may send the alert when the life expectancy of the CDP seal 108 falls below a predetermined threshold (e.g., 20% of seal life remaining) so that the CDP seal 108 may be serviced before it enters a failure condition (e.g., cracks). The controller 162 thus predicts when the CDP seal 108 needs to be replaced and sends an alert to reduce the possibility of the CDP seal 108 failing during a flight. The controller 162 may also be configured to output the predicted life expectancy of the CDP seal 108 before the CDP seal 108 needs to be serviced, for example, responsive to a request for the current condition of the CDP seal 108

While the above discussion describes the seal monitoring apparatus 150 being used to monitor the operational and maintenance conditions of the CDP seal 108, the seal monitoring apparatus 150 may similarly be used to monitor conditions of other seals of the turbofan engine and/or other devices including gas engines, aeroderivative power generation gas turbines, and centrifugal gas compressors. Regarding FIGS. 6-7, for example, the seal monitoring apparatus 150 may be used to monitor the condition of other seals of the engine 100.

Figure 6:
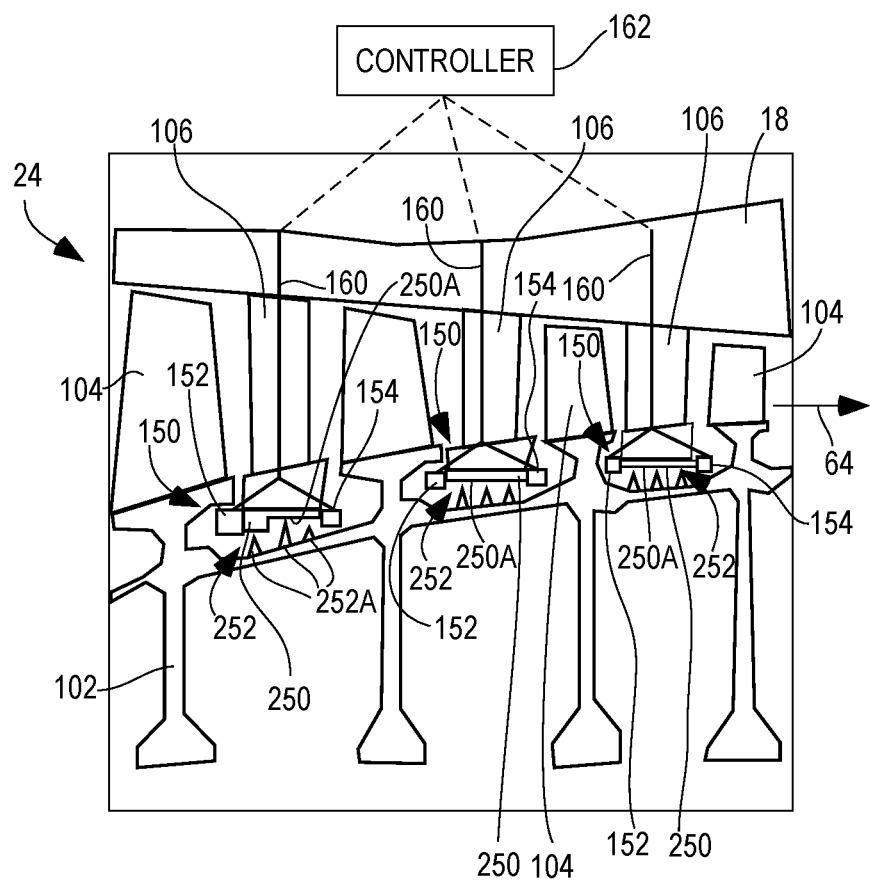
FIG. 6 is a detail view of a portion of the gas turbine engine of FIG. 2 including a high-pressure compressor and seal monitoring apparatuses.

With respect to FIG. 6, a detail view of section B (e.g., the high-pressure compressor 24 section) of the turbofan engine 100 of FIG. 2 is provided including seal monitoring apparatuses 150. As explained above, the high-pressure compressor 24 includes a plurality of stages of airfoils 104 extending from the compressor rotor 102 and a plurality of sets of guide vanes 106 between the stages of airfoils 104. Each set of the guide vanes 106 includes a seal stator 250 mounted at the end thereof adjacent to the compressor rotor 102. The compressor rotor 102 includes labyrinth seals 252 mounted on an outside surface thereof in between each stage of the airfoils 104 that form a seal with the seal stator 250. The labyrinth seals 252 may be mechanical seals that are positioned adjacent to the seal stators 250 to provide a tortuous path to inhibit fluid from passing between the compressor rotor 102 and the guide vanes 106, for example, as the compressor rotor 102 rotates. Each labyrinth seal 252 may include one or more teeth 252A that extend to a sealing surface 250A of the seal stator 250.

The seal monitoring apparatus 150 may be used to monitor one or more of the labyrinth seals 252 similar to the CDP seal 108 as described above. For each monitored seal, the first pressure sensor 152 of the seal monitoring apparatus 150 may be mounted on a first side of the labyrinth seal 252 and the second pressure sensor 154 may be mounted on a second side of the labyrinth seal 252. The wires 160 of the seal monitoring apparatus 150 may extend out of the core turbine engine 16 and communicatively couple the pressure sensors 152, 154 to the controller 162. For example, the wires 160 may be routed out of the core turbine engine 16 through a cavity of the guide vanes 106 and an opening in the tubular outer casing 18. The controller 162 may receive and process the pressure data of the pressure sensors 152, 154 as described with respect to the CDP seal 108 above with regard to FIG. 4 to determine operational and/or maintenance conditions of the labyrinth seal 252 and to output signals based upon the determined conditions.

With respect to FIG. 7, a detail view of section C (e.g., the low-pressure turbine 30 section) of the turbofan engine 100 of FIG. 2 is provided including seal monitoring apparatuses 150. As explained above, the low-pressure turbine 30 includes the turbine rotor 110 having stages of turbine airfoils 112 spaced axially along the turbine rotor 110 that rotate relative to the tubular outer casing 18. The low-pressure turbine 30 further includes sets of turbine nozzles 114 extending from the tubular outer casing 18 in between each stage of the turbine airfoils 112. The turbine nozzles 114 include a seal stator 260 at an end opposite the outer casing 18. The turbine rotor 110 includes labyrinth seals 262 including one or more teeth 262A that engage the seal stator 260 of the associated turbine nozzle 114. The seal monitoring apparatus 150 may be mounted within the low-pressure turbine 30 to monitor one or more of the labyrinth seals 262 as described above with respect to the labyrinth seals 252 of FIG. 6. For example, the first and second pressure sensors 152, 154 of the seal monitoring apparatus 150 may be mounted to the ends of the turbine nozzles 114 on opposite sides of the labyrinth seal 262 to monitor the labyrinth seal 262. For instance, the first pressure sensor 152 may be mounted to the seal stator 260 on one side of the labyrinth seal 262 and the second pressure sensor 154 may be mounted to the seal stator 260 on the opposite side of the labyrinth seal 262. The wires 160 of the seal monitoring apparatus 150 may extend from the pressure sensors 152, 154 to the controller 162 such that the controller 162 receives sensor data of the pressure sensors 152, 154 via the wires 160. The wires 160 may be routed through an internal cavity of the turbine nozzle 114 out of the core turbine engine 16 through an opening in the tubular outer casing 18.

The turbine airfoils 112 may include end portions, such as tips 112A, that include labyrinth seals 264 that extend toward an associated seal stator 266 mounted to an internal surface of the outer casing 18. The seal monitoring apparatus 150 may be mounted in the low-pressure turbine 30 to monitor one or more of the labyrinth seals 264 as described above. For instance, the first pressure sensor 152 of the seal monitoring apparatus 150 may be mounted to the seal stator 260 and/or outer casing 18 on one side of the labyrinth seal 264 and the second pressure sensor 154 may be mounted to the seal stator 266 and/or outer casing 18 on the opposite side of the labyrinth seal 264. The wires 160 of the seal monitoring apparatus 150 may extend from the pressure sensors 152, 154 to the controller 162 such that the controller 162 receives sensor data of the pressure sensors 152, 154 via the wires 160. The wires 160 may be routed through out of the core turbine engine 16 through an opening in the outer casing 18.

The seal monitoring apparatus(es) 150 may operate as described above with respect to FIG. 4 to analyze the sensor data and determine conditions of the monitored seal(s) 262, 264.

Further aspects of the disclosure are provided by the subject matter of the following clauses:

A seal monitoring apparatus comprising: one or more pressure sensors mounted at a seal of a turbine to measure pressure on a first side of the seal; and a controller in communication with the one or more pressure sensors, the controller configured to: receive pressure data from the one or more pressure sensors; determine a condition of the seal based at least in part on the pressure data; and output a signal upon determining a change in the condition of the seal.

The seal monitoring apparatus of any preceding clause wherein to determine the condition includes determining the seal is in a failure condition, wherein to output the signal includes sending the signal to cause adjustment of operation of the turbine when the condition is determined to be the failure condition.

The seal monitoring apparatus of any preceding clause wherein the turbine is a turbine engine and wherein to cause adjustment of the operation of the engine includes causing the turbine engine to be operated in a reduced performance mode.

The seal monitoring apparatus of any preceding clause wherein to determine the condition of the seal includes detecting a shift from a first pressure pattern to a second pressure pattern.

The seal monitoring apparatus of any preceding clause wherein detecting the shift from the first pressure pattern to the second pressure pattern includes detecting a shift in one or more of an amplitude characteristic and a frequency of the pressure data.

The seal monitoring apparatus of any preceding clause wherein to determine the condition of the seal includes estimating a life expectancy of the seal based at least in part on the pressure data, and wherein to output the signal includes sending a message to service the seal when the life expectancy falls below a predetermined threshold.

The seal monitoring apparatus of any preceding clause wherein estimating the life expectancy of the seal includes identifying fatigue cycles of the seal based at least in part on a pressure amplitude of the pressure data exceeding a threshold.

The seal monitoring apparatus of any preceding clause wherein estimating the life expectancy of the seal includes updating a model of the seal based at least in part on an amplitude and/or frequency of the pressure data.

The seal monitoring apparatus of any preceding clause wherein the one or more pressure sensors includes a first pressure sensor mounted at the first side of the seal and a second pressure sensor mounted at a second side of the seal.

The seal monitoring apparatus of any preceding clause wherein the turbine is a turbine engine including a guide vane, wherein one or more wires of the one or more pressure sensors extend to the controller through a cavity of the guide vane.

A method of monitoring a seal comprising: receiving, at a processor, pressure data from a pressure sensor mounted at a seal of a turbine, the pressure sensor configured to measure pressure on at least one of a first side of the seal and a second side of the seal; determining a condition of the seal based at least in part on the pressure data; and outputting a signal upon determining a change in the condition of the seal.

The method of any preceding clause wherein determining the condition of the seal includes determining the seal is in a failure condition, wherein outputting the signal includes causing adjustment of operation of the turbine when the condition is determined to be the failure condition.

The method of any preceding clause wherein the turbine is a turbine engine and wherein causing adjustment of the operation of the turbine engine includes causing the turbine engine to be operated in a reduced performance mode.

The method of any preceding clause wherein determining the condition of the seal includes detecting a shift from a first pressure pattern to a second pressure pattern.

The method of any preceding clause wherein detecting the shift from the first pressure pattern to the second pressure pattern includes detecting a shift in one or more of an amplitude characteristic and a pressure frequency of the pressure data.

The method of any preceding clause wherein determining the condition of the seal includes estimating a life expectancy of the seal based at least in part on the pressure data, and wherein outputting the signal includes sending a message to service the seal when the life expectancy falls below a predetermined threshold.

The method of any preceding clause wherein estimating the life expectancy of the seal includes identifying fatigue cycles of the seal based at least in part on the pressure data.

The method of any preceding clause wherein identifying fatigue cycles includes identifying when a pressure amplitude of the pressure data exceeds a threshold.

The method of any preceding clause wherein identifying fatigue cycles includes identifying when a pressure amplitude of one or more select frequencies exceeds a threshold.

The method of any preceding clause wherein estimating the life expectancy of the seal includes updating a model of the seal based at least in part on an amplitude and/or frequency of the pressure data.

A seal monitoring apparatus comprising: a controller in communication with one or more pressure sensors mounted on a first side of a seal of a turbine to measure pressure at the first side of the seal, the controller configured to: receive pressure data from the one or more pressure sensors; determine a condition of the seal based at least in part on the pressure data; and output a signal upon determining a change in the condition of the seal.

The seal monitoring apparatus of any preceding clause wherein to determine the condition includes determining the seal is in a failure condition, wherein to output the signal includes sending the signal to cause adjustment of an operation of the turbine when the condition is determined to be the failure condition.

The seal monitoring apparatus of any preceding clause wherein the turbine is turbine engine and wherein to cause adjustment of the operation of the turbine engine includes causing the turbine engine to be operated in a reduced performance mode.

The seal monitoring apparatus of any preceding clause wherein to determine the condition of the seal includes detecting a change from a first pressure pattern to a second pressure pattern.

The seal monitoring apparatus of any preceding clause wherein detecting the change from the first pressure pattern to the second pressure pattern includes detecting a shift in one or more of an amplitude characteristic and a frequency of the pressure data.

The seal monitoring apparatus of any preceding clause wherein to determine the condition of the seal includes estimating a life expectancy of the seal based at least in part on the pressure data, and wherein to output the signal includes sending a message to service the seal when the life expectancy falls below a predetermined threshold.

The seal monitoring apparatus of any preceding clause wherein estimating the life expectancy of the seal includes identifying fatigue cycles of the seal based at least in part on a pressure amplitude of the pressure data exceeding a threshold.

The seal monitoring apparatus of any preceding clause wherein estimating the life expectancy of the seal includes updating a model of the seal based at least in part on an amplitude and/or frequency of the pressure data.

The seal monitoring apparatus of any preceding clause wherein the one or more pressure sensors includes a first pressure sensor mounted at the first side of the seal and a second pressure sensor mounted at a second side of the seal.

The seal monitoring apparatus of any preceding clause wherein the turbine is a turbine engine including a guide vane, wherein one or more wires of the one or more pressure sensors extend to the controller through a cavity of the guide vane.

An engine comprising: one or more pressure sensors mounted at a seal of the engine to measure pressure on a first side of the seal; and a controller in communication with one or more pressure sensors, the controller configured to: receive pressure data from the one or more pressure sensors; determine a condition of the seal based at least in part on the pressure data; and output a signal upon determining a change in the condition of the seal.

The engine of any preceding clause wherein to determine the condition includes determining the seal is in a failure condition, wherein to output the signal includes sending the signal to cause adjustment of an operation of the engine when the condition is determined to be the failure condition.

The engine of any preceding clause wherein to cause adjustment of the operation of the engine includes causing the engine to be operated in a reduced performance mode.

The engine of any preceding clause wherein the engine is a turbine engine.

The engine of any preceding clause wherein to determine the condition of the seal includes detecting a shift from a first pressure pattern to a second pressure pattern.

The engine of any preceding clause wherein detecting the shift from the first pressure pattern to the second pressure pattern includes detecting a shift in one or more of an amplitude characteristic and a frequency of the pressure data.

The engine of any preceding clause wherein to determine the condition of the seal includes estimating a life expectancy of the seal based at least in part on the pressure data, and wherein to output the signal includes sending a message to service the seal when the life expectancy falls below a predetermined threshold.

The engine of any preceding clause wherein estimating the life expectancy of the seal includes identifying fatigue cycles of the seal based at least in part on a pressure amplitude of the pressure data exceeding a threshold.

The engine of any preceding clause wherein estimating the life expectancy of the seal includes updating a model of the seal based at least in part on an amplitude and/or frequency of the pressure data.

The engine of any preceding clause wherein the one or more pressure sensors includes a first pressure sensor mounted at the first side of the seal and a second pressure sensor mounted at a second side of the seal.

The engine of any preceding clause wherein the engine is a turbine engine including a guide vane, wherein one or more wires of the one or more pressure sensors extend to the controller through a cavity of the guide vane.

A seal monitoring apparatus comprising: a temperature sensor mounted at a seal of a device; and a controller in communication with the temperature sensor, the controller configured to: receive measured temperature data from the temperature sensor; calculate expected temperature data for the seal based at least in part on operating conditions of the device; and determine a condition of the seal based at least in part on a temperature difference of the measured temperature data from the expected temperature data.

The seal monitoring apparatus of any preceding clause wherein the seal is a carbon seal and the temperature sensor is embedded in the seal.

The seal monitoring apparatus of any preceding clause wherein to calculate the expected temperature data includes inputting the operating conditions of the device into a model of the seal configured to output the expected temperature data based at least in part on the input operating conditions and a characteristic of the seal.

The seal monitoring apparatus of any preceding clause wherein the device is an engine and the operating conditions includes one or more of an engine speed, a temperature on at least one of a first side and a second side of the seal, a pressure on at least one of the first side and the second side of the seal.

The seal monitoring apparatus of any preceding clause wherein to determine the condition of the seal includes estimating a wear rate of the seal based on the temperature difference.

The seal monitoring apparatus of any preceding clause wherein estimating the wear rate of the seal includes referencing one or more datasets of the seal correlating the temperature difference to the wear rate.

The seal monitoring apparatus of any preceding clause wherein to determine the condition of the seal includes estimating one or more wear rates of the seal based on the temperature difference over time and determining a cumulative wear of the seal over time based at least in part on a time the seal is at each of the one or more wear rates.

The seal monitoring apparatus of any preceding clause wherein to determine the condition of the seal includes estimating a remaining life expectancy of the seal.

The seal monitoring apparatus of any preceding clause wherein the controller is further configured to output a signal upon determining a change in the condition of the seal, the signal indicating the seal is in a failure condition and/or to service the seal.

The seal monitoring apparatus of any preceding clause wherein the device is an engine including a guide vane, wherein one or more wires of the temperature sensor extend to the controller through a lumen of a multi-lumen pipe that extends through a cavity of the guide vane.

The seal monitoring apparatus of any preceding clause further comprising a pressure sensor mounted at the seal and in communication with the controller, the controller configured to receive pressure data from the pressure sensor and determine a condition of the seal based at least in part on the pressure data of the pressure sensor.

The seal monitoring apparatus of any preceding clause further comprising a chemical sensor mounted at the seal and in communication with the controller, the controller configured to receive chemical data from the chemical sensor and determine a condition of the seal based at least in part on the chemical data of the chemical sensor.

The seal monitoring apparatus of any preceding clause further comprising a viscosity sensor mounted at the seal and in communication with the controller, the controller configured to receive oil viscosity data from the viscosity sensor and determine a condition of the seal based at least in part on the oil viscosity data of the viscosity sensor.

A seal monitoring apparatus comprising: a controller in communication with a temperature sensor mounted at a seal of a device, the controller configured to: receive measured temperature data from the temperature sensor; calculate expected temperature data for the seal based at least in part on operating conditions of the device; and determine a condition of the seal based at least in part on a temperature difference of the measured temperature data from the expected temperature data.

The seal monitoring apparatus of any preceding clause wherein to calculate the expected temperature data includes inputting the operating conditions of the device into a model of the seal configured to output the expected temperature data based at least in part on the input operating conditions and a characteristic of the seal.

The seal monitoring apparatus of any preceding clause wherein the device is an engine and the operating conditions includes one or more of an engine speed, a temperature on at least one of a first side and a second side of the seal, a pressure on at least one of the first side and the second side of the seal.

The seal monitoring apparatus of any preceding clause wherein to determine the condition of the seal includes estimating a wear rate of the seal based on the temperature difference.

The seal monitoring apparatus of any preceding clause wherein estimating the wear rate of the seal includes referencing one or more datasets of the seal correlating the temperature difference to the wear rate.

The seal monitoring apparatus of any preceding clause wherein to determine the condition of the seal includes estimating one or more wear rates of the seal based on the temperature difference over time and determining a cumulative wear of the seal over time based at least in part on a time the seal is at each of the one or more wear rates.

The seal monitoring apparatus of any preceding clause wherein to determine the condition of the seal includes estimating a remaining life expectancy of the seal.

The seal monitoring apparatus of any preceding clause wherein the controller is further configured to output a signal upon determining a change in the condition of the seal, the signal indicating the seal is in a failure condition and/or to service the seal.

The seal monitoring apparatus of any preceding clause wherein the controller is further in communication with a pressure sensor mounted at the seal, the controller configured to receive pressure data from the pressure sensor and determine a condition of the seal based at least in part on the pressure data of the pressure sensor.

The seal monitoring apparatus of any preceding clause wherein the controller is further in communication with a chemical sensor mounted at the seal, the controller configured to receive chemical data from the chemical sensor and determine a condition of the seal based at least in part on the chemical data of the chemical sensor.

The seal monitoring apparatus of any preceding clause wherein the controller is further in communication with a viscosity sensor mounted at the seal, the controller configured to receive oil viscosity data from the viscosity sensor and determine a condition of the seal based at least in part on the oil viscosity data of the viscosity sensor.

A method of monitoring a seal comprising: receiving, at a processor, measured temperature data from a temperature sensor mounted at the seal of a device; calculating expected temperature data for the seal based at least in part on operating conditions of the device; and determining a condition of the seal based at least in part on a temperature difference of the measured temperature data from the expected temperature data.

The method of any preceding clause wherein the seal is a carbon seal and the temperature sensor is embedded in the seal.

The method of any preceding clause wherein calculating the expected temperature data includes inputting the operating conditions of the device into a model of the seal, the model configured to output the expected temperature data based at least in part on the input operating conditions and a characteristic of the seal.

The method of any preceding clause wherein the device is an engine and the operating conditions includes one or more of an engine speed, a temperature on at least one of a first side and a second side of the seal, and a pressure on at least one of the first side and the second side of the seal.

The method of any preceding clause wherein determining the condition of the seal includes estimating a wear rate of the seal based on the temperature difference.

The method of any preceding clause wherein estimating the wear rate of the seal includes referencing one or more datasets of the seal correlating the temperature difference to the wear rate.

The method of any preceding clause wherein determining the condition of the seal includes estimating one or more wear rates of the seal based on the temperature difference over time and determining a cumulative wear of the seal over time based at least in part on a time the seal is at each of the one or more wear rates.

The method of any preceding clause wherein determining the condition of the seal includes estimating a remaining life expectancy of the seal.

The method of any preceding clause further comprising outputting a signal upon determining a change in the condition of the seal, the signal indicating the seal is in a failure condition and/or to service the seal.

The method of any preceding clause wherein the device is an engine including a guide vane, wherein one or more wires of the temperature sensor extend to the processor through a lumen of a multi-lumen pipe that extends through a cavity of the guide vane.

An engine comprising a housing; a rotor supported by a bearing such that the rotor is rotatable in the housing, the rotor including at least one airfoil; a seal isolating a bearing sump including the bearing from a cavity of the housing including the at least one airfoil; and a seal monitoring apparatus mounted to the seal and configured to determine a condition of the seal.

The engine of any preceding clause wherein the seal monitoring apparatus includes a temperature sensor embedded in the seal.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the disclosed concept.

What is claimed is:

1. A seal monitoring apparatus comprising:
   one or more pressure sensors mounted at a seal of a turbine to measure pressure on a first side of the seal; and
   a controller in communication with the one or more pressure sensors, the controller configured to:
   receive pressure data from the one or more pressure sensors;
   determine a condition of the seal based at least in part on the pressure data; and
   output a signal upon determining a change in the condition of the seal;

wherein to determine the condition of the seal includes estimating a life expectancy of the seal based at least in part on the pressure data, and wherein to output the signal includes sending a message to service the seal when the life expectancy falls below a predetermined threshold;

wherein estimating the life expectancy of the seal includes:

identifying fatigue cycles of the seal based at least in part on a pressure amplitude of the pressure data exceeding a threshold; or updating a model of the seal based at least in part on an amplitude and/or frequency of the pressure data.

2. The seal monitoring apparatus of claim 1 wherein to determine the condition further includes determining the seal is in a failure condition, wherein to output the signal includes sending the signal to cause adjustment of an operation of the turbine when the condition is determined to be the failure condition.

3. The seal monitoring apparatus of claim 2 wherein the turbine is included in a turbine engine and wherein to cause adjustment of the operation of the turbine engine includes causing the turbine engine to be operated in a reduced performance mode.

4. The seal monitoring apparatus of claim 1 wherein to determine the condition of the seal further includes detecting a shift from a first pressure pattern to a second pressure pattern.

5. The seal monitoring apparatus of claim 4 wherein detecting the shift from the first pressure pattern to the second pressure pattern includes detecting a shift in one or more of an amplitude characteristic and a frequency of the pressure data.

6. The seal monitoring apparatus of claim 1 wherein the one or more pressure sensors includes a first pressure sensor mounted at the first side of the seal and a second pressure sensor mounted at a second side of the seal.

7. The seal monitoring apparatus of claim 1 wherein the turbine is included in a turbine engine, and the turbine engine includes a guide vane, wherein one or more wires of the one or more pressure sensors extend to the controller through a cavity of the guide vane.

8. A method of monitoring a seal comprising:

receiving, at a processor, pressure data from a pressure sensor mounted at a seal of a turbine, the pressure sensor configured to measure pressure on a first side of the seal;

determining a condition of the seal of the turbine based at least in part on the pressure data; and outputting a signal upon determining a change in the condition of the seal;

wherein determining the condition of the seal includes estimating a life expectancy of the seal based at least in part on the pressure data, and wherein outputting the signal includes sending a message to service the seal when the life expectancy falls below a predetermined threshold;

wherein estimating the life expectancy of the seal includes:

identifying fatigue cycles of the seal based at least in part on the pressure data; or estimating the life expectancy of the seal includes updating a model of the seal based at least in part on an amplitude and/or frequency of the pressure data.

9. The method of claim 8 wherein determining the condition of the seal further includes determining the seal is in a failure condition, wherein outputting the signal includes causing adjustment of an operation of the turbine when the condition is determined to be the failure condition.

10. The method of claim 9 wherein the turbine is included in a turbine engine and wherein causing adjustment of the operation of the turbine engine includes causing the turbine engine to be operated in a reduced performance mode.

11. The method of claim 8 wherein determining the condition of the seal further includes detecting a shift from a first pressure pattern to a second pressure pattern.

12. The method of claim 11 wherein detecting the shift from the first pressure pattern to the second pressure pattern includes detecting a shift in one or more of an amplitude characteristic and a pressure frequency of the pressure data.

13. The method of claim 8 wherein identifying fatigue cycles includes identifying when a pressure amplitude of the pressure data exceeds a threshold.

14. The method of claim 8 wherein identifying fatigue cycles includes identifying when a pressure amplitude of one or more select frequencies exceeds a threshold.

* * * * *